United States Patent
Hirata et al.

(10) Patent No.: US 12,356,345 B2
(45) Date of Patent: Jul. 8, 2025

(54) COMMUNICATION DEVICE AND COMMUNICATION METHOD

(71) Applicant: Sony Group Corporation, Tokyo (JP)

(72) Inventors: Ryuichi Hirata, Tokyo (JP); Yusuke Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 347 days.

(21) Appl. No.: 17/916,814

(22) PCT Filed: Feb. 18, 2021

(86) PCT No.: PCT/JP2021/006098
§ 371 (c)(1),
(2) Date: Oct. 4, 2022

(87) PCT Pub. No.: WO2021/215097
PCT Pub. Date: Oct. 28, 2021

(65) Prior Publication Data
US 2023/0156633 A1    May 18, 2023

(30) Foreign Application Priority Data
Apr. 21, 2020 (JP) .................................. 2020-075756

(51) Int. Cl.
*H04W 56/00* (2009.01)

(52) U.S. Cl.
CPC .............................. *H04W 56/0005* (2013.01)

(58) Field of Classification Search
CPC ............ H04W 56/0005; H04W 76/15; H04W 72/0446; H04W 84/12; H04W 72/541; H04W 16/14
See application file for complete search history.

(56) References Cited

U.S. PATENT DOCUMENTS

2021/0329547 A1* 10/2021 Kim .................. H04W 52/0229
2021/0329698 A1* 10/2021 Jang ...................... H04W 80/02

FOREIGN PATENT DOCUMENTS

| JP | 2009-105892 A | 5/2009 |
| JP | 2009-267900 A | 11/2009 |

(Continued)

OTHER PUBLICATIONS

Khorov Evgeny et al: "A Tutorial on IEEE 802.llax High Efficiency WLANs", IEEE Communications Surveys & Tutorials, IEEE, USA, Jan. 1, 2019 (Sep. 1, 2019), vol. 21, No. 1, pp. 197-216, USA.

(Continued)

*Primary Examiner* — Dady Chery
(74) *Attorney, Agent, or Firm* — XSENSUS LLP

(57) ABSTRACT

Provided is a communication device that performs multi-link operation by synchronous transmission.
The communication device includes a communication unit that performs communication by a plurality of links, and a control unit that controls a communication operation by the communication unit. The control unit performs control to transmit a signal including information regarding a period in which data transmission is performed by the plurality of links. The information regarding the period includes at least one piece of information of a start time of the period, a time length of the period, and a link for performing transmission is the period. The control unit controls description of information regarding the start time of the period and the time length of the period so that the periods overlap at each link used for the data transmission.

6 Claims, 11 Drawing Sheets

(56) References Cited

FOREIGN PATENT DOCUMENTS

| | | |
|---|---|---|
| JP | 2011-211709 A | 10/2011 |
| JP | 2014-522196 A | 8/2014 |
| JP | 2015511077 A | 4/2015 |
| WO | WO-2020032664 A1 | 2/2020 |
| WO | WO-2020040587 A1 | 2/2020 |

OTHER PUBLICATIONS

International Search Report and Written Opinion mailed on Apr. 13, 2021, received for PCT Application PCT/JP2021/006098, filed on Feb. 18, 2021, 9 pages including English Translation.

\* cited by examiner

FIG. 8
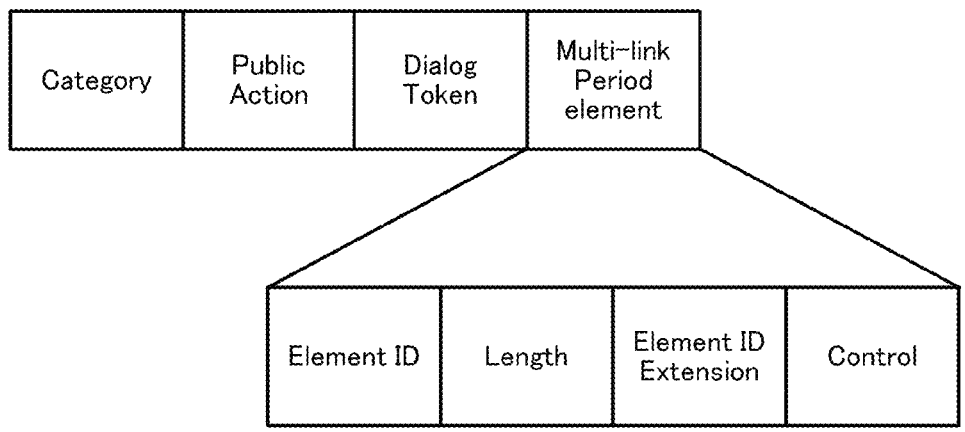
FIG. 9
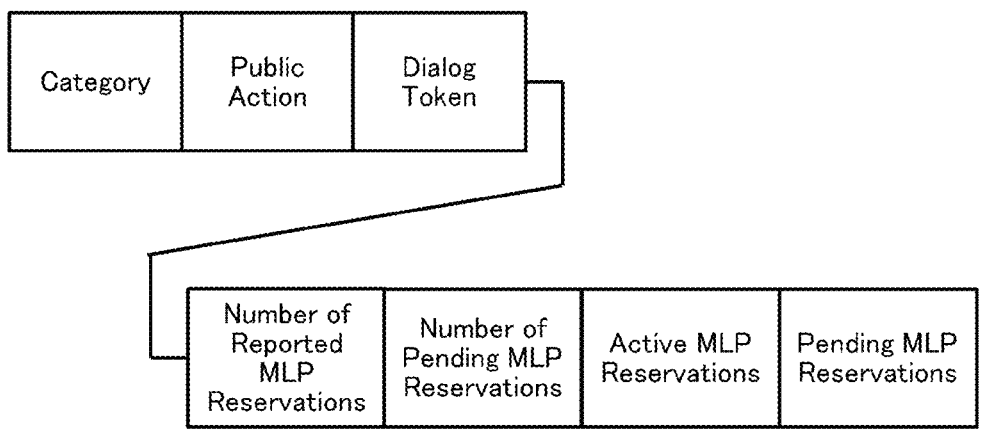
FIG. 10

COMMUNICATION DEVICE AND COMMUNICATION METHOD

CROSS-REFERENCE TO RELATED APPLICATIONS

The present application is based on PCT filing PCT/JP2021/006098, filed Feb. 18, 2021, which claims priority to Japanese Patent Application No. 2020-075756, filed Apr. 21, 2020, the entire contents of each are incorporated herein by reference.

TECHNICAL FIELD

The technology (hereinafter, "the present disclosure") disclosed in this specification relates to a communication device and a communication method that bundle a plurality of links to perform wireless communication.

BACKGROUND ART

In recent years, data traffic in wireless communication such as virtual reality (VR) and 8K video transmission has increased. In order to accommodate such traffic, improvement in throughput is required in a wireless local area network (LAN). Currently, a multi-link operation (MLO) for bundling a plurality of links to perform communication is being standardized as a technique useful for improving throughput.

The MLO can be roughly divided into an asynchronous transmission system in which each link performs an independent communication operation and a synchronous transmission system in which transmission timings are completely aligned between links. Since channels between links are close in the MLO and leakage occurs, it may be difficult to perform transmission by one link and reception by another link. In this case, according to the synchronous transmission system in which the transmission timings are aligned in a plurality of links, simultaneous transmission and reception between the links does not occur, and the effect by the MLO can be obtained.

When MLO by synchronous transmission is performed, it is required that all links to be used can be simultaneously transmitted, in other words, each link as simultaneously in an idle state. However, a terminal that does not support the MLO, such as a legacy terminal, performs a transmission operation independently of the other links by using only one link. For this reason, the time during which all the plurality of links can be transmitted by synchronous transmission in the idle state is limited, and the effect of improving the throughput by the MLO cannot be expected.

In addition, in IEEE 802.11ax, an operation of setting a period called a Quiet Time Period (QTP) is standardized. This is an operation of setting a period for suppressing transmission of another terminal in a basic service set (BSS) in order for a terminal to prioritize communication of a certain system. In QTP operation, first, a terminal that wants to perform communication of a certain system transmits a QTP request to an access point, and the access point returns a QTP response to the terminal. Next, at a start timing of the period for suppressing transmission of another terminal indicated by the QTP request and the QTP response, the access point transmits a QTP Setup to surrounding terminals. When receiving the QTP Setup, terminals other than the transmission source of the QTP request suppress transmission only for a period corresponding to a Duration described in the frame. As a result, communication other than communication. between terminals can be prevented from occurring. However, in order to suppress the transmission of the terminals at each link in order to perform MLO, it is necessary to simultaneously transmit a QTP Setup over a plurality of links at the start timing. Since there is a technical problem that simultaneous transmission cannot be performed by a plurality of links in the first place, it is not possible to realize PLO by synchronous transmission using the QTP operation. Note that there has been proposed a wireless LAN system that indicates that a second subchannel is silenced during a silence period by transmission of a frame including a silence element and a silence channel element, and further indicates a condition and a period in which a first subchannel can be used (see Patent Document 1).

CITATION LIST

Patent Document

Patent Document 1: JP 2014-522196 W

SUMMARY OF THE INVENTION

Problems to be Solved by the Invention

An object of the present disclosure is to provide a communication device and a communication method that perform MLO by synchronous transmission.

Solutions to Problems

The present disclosure has been made in view of the above problems, and a first aspect thereof is a communication device, including:
  a communication unit that performs communication by a plurality of links; and
  a control unit that controls a communication operation by the communication unit, in which
  the control unit performs control to transmit a signal including information regarding a period in which data transmission is performed by the plurality of links.

The information regarding the period includes at least one piece of information of a start time of the period, a time length of the period, and a link for performing transmission in the period. The control unit controls description of information regarding the start time of the period and the time length of the period so that the periods overlap at each link used for the data transmission.

Further, a second aspect of the present disclosure is a communication method of a communication device that performs communication by a plurality of links, the communication method including the steps of:
  setting a period in which data transmission is performed by the plurality of links; and
  transmitting a signal including information regarding the period.

Furthermore, a third aspect of the present disclosure is a communication device, including:
  a communication unit that performs communication by at least one of a plurality of links; and
  a control unit that controls a communication operation by the communication unit, in which
  the control unit performs control to receive a signal including information regarding a period in which data transmission is performed by the plurality of links by at least one of the plurality of links and suppress transmission at a link at which the signal including the information regarding the period is received.

The information regarding the period includes at least one piece of information of a start time of the period, a time length of the period, and a link for performing transmission in the period. Then, the control unit performs control to suppress transmission at a link at which the signal has been received on the basis of the start time of the period and the time length of the period described in the signal.

Furthermore, a fourth aspect of the present disclosure is a communication method of a communication device that performs communication by a plurality of links, the communication method including the steps of:
receiving a signal including information regarding a period in which data transmission is performed by the plurality of links by at least one of the plurality of links; and
suppressing transmission at a link at which the signal including information regarding the period has been received.

Effects of the Invention

According to the present disclosure, it is possible to provide a communication device and a communication method that perform MLO by synchronous transmission.

Note that the effects described in The present specification are merely examples, and the effects brought by the present disclosure are not limited thereto. Furthermore, the present disclosure may further provide additional effects in addition to the above effects.

Still other objects, features, and advantages of the present disclosure will become apparent from a more detailed description based on embodiments to be described later and the accompanying drawings.

BRIEF DESCRIPTION OF DRAWINGS

FIG. 8 is a diagram illustrating an exemplary format of an MLP End frame.

FIG. 9 is a diagram illustrating an exemplary format of an MLP Advertisement frame.

FIG. 10 is a diagram illustrating an exemplary format of an MLP Advertisement Response frame.

MODE FOR CARRYING OUT THE INVENTION

Hereinafter, the present disclosure will be described is the following order with reference to the drawings.
A. Overview
B. System Configuration
C. Device Configuration
D. Operation Example 1
E. Frame Format
F. Modification of Operation Example 1
G. Operation of communication Device
H. Operation example 2
I. Effects A. Overview In the present disclosure, before a start timing of a multi-link period (MLP) in which an MLO (hereinafter, also simply referred to as "multi-link transmission") is performed, a terminal that wants to perform the MLO of the synchronous transmission system or a terminal that has received a request from the terminal transmits a signal (MLP Setup frame) for suppressing transmission of each terminal in the MLP period to surrounding terminals at a plurality of links. The HIP Setup frame transmitted at each link is transmitted at different timing, and notifies the time (offset) from each transmission timing to the start timing of the MLP and the length of the MLP. A terminal that has received the MLP Setup frame suppresses transmission in the designated period. Also for a conventional (legacy) terminal that does riot support the present disclosure. Duration of the MLP Setup frame is set in accordance with the length of the NLP.

Thus, a terminal that intends to perform the multi-link transmission transmits the MLP Setup frame by each link and notifies the time until start of the MLP and the length of the MLP, and therefore, when the MLP comes, transmission by surrounding terminals is suppressed, and an opportunity to perform the multi-link transmission is easily acquired.

B. System Configuration

Figure 1:
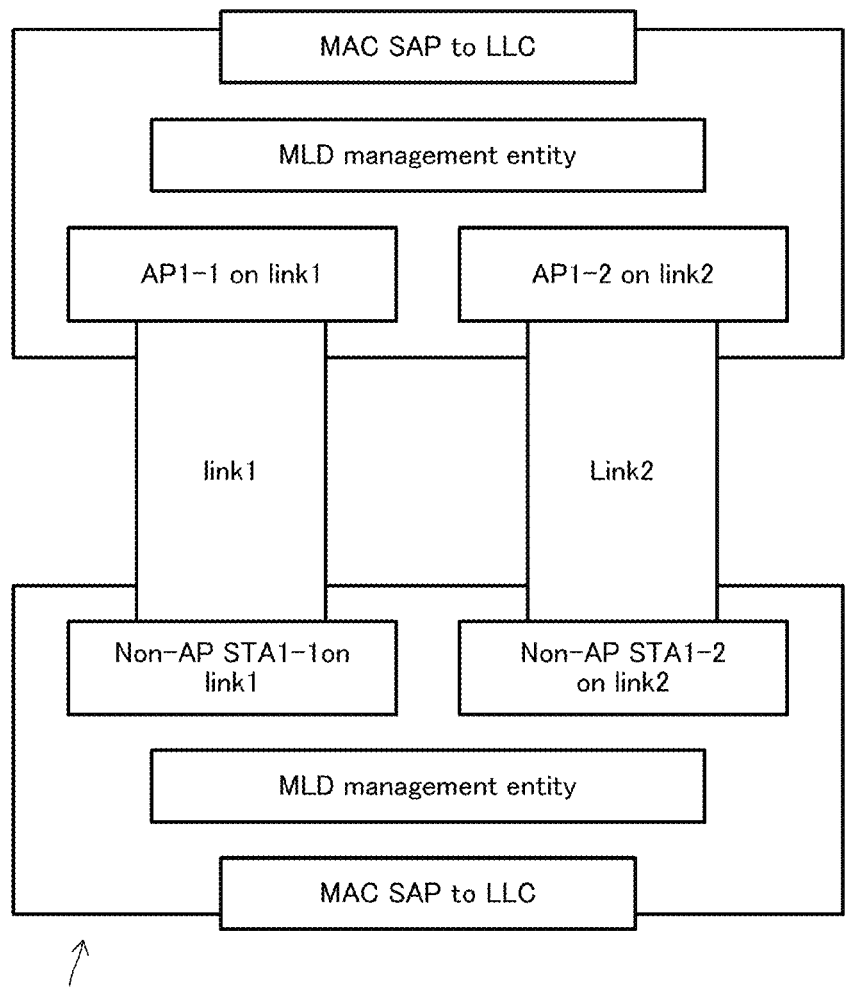
FIG. 1 is a diagram illustrating a configuration example of a communication system 100.

FIG. 1 schematically illustrates a configuration example of a communication system 100 to which the present disclosure is applied. The illustrated communication system 100 includes an access point (AP) 110 and a terminal (STA) 120. The terminal 120 is not an access point, that is, is a non-AP. In the communication system 100, a first link and a second link can be used, and the access point 110 and the terminal 120 are connected via the first link and the second link.

Both the access point 110 and the terminal 120 are communication devices (Multi-link Devices: MLDs) that perform MLO using a first link (link1) and a second link (link2), that is, AP MLD and non-AP MLD, respectively. Note that, in the following, when simply referred to as "multi-link operation" or MLO, the MLO by synchronous transmission is indicated unless otherwise specified.

In the example shown in FIG. 1, two access points, AP1-1 operating on a first link and AP1-2 operating on a second link, are included in the access point 110. Also, Two terminals, a non-AP STA1-1 that operates on the first link and a non-AP STA1-2 that operates on the second link, are included in the terminal 120. However, the number of access points and terminals included in each of the access point 110 and the terminal 120 is not limited to two, and may be three or more. That is, the number of links connecting the access point 110 and the terminal 120 is not limited to two, and they may be connected through three or more links. In addition, although only one access point. and one terminal are illustrated in the communication system 100 in FIG. 1 for simplification of the drawing, a plurality of access points and terminals may be connected. Furthermore, one communication device may include one or more access points (AP MLD) and one or more terminals (non-AP MLD).

An MLD management entity is an entity that manages operations in the access point 110 and the terminal 120 that are MLDs, respectively. In addition, MAC-SAP to LLC is a point (Service Access Point) that provides a service of a Media Access Control (MAC) layer to a Logical Link Control (LLC) layer, which is an upper layer of the MAC laver.

Figure 2:
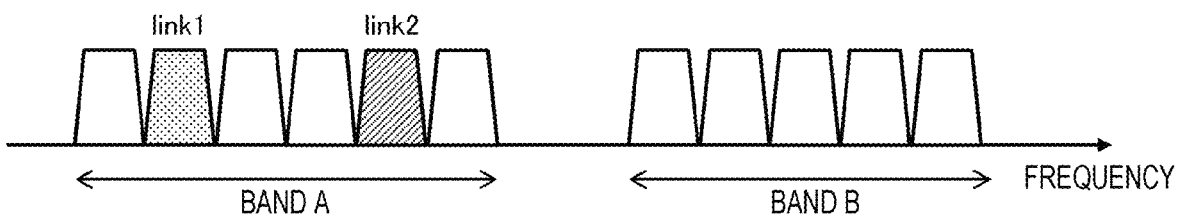
FIG. 2 is a diagram illustrating an example of channel selection of a first link (link1) and a second link (link2).
Figure 3:
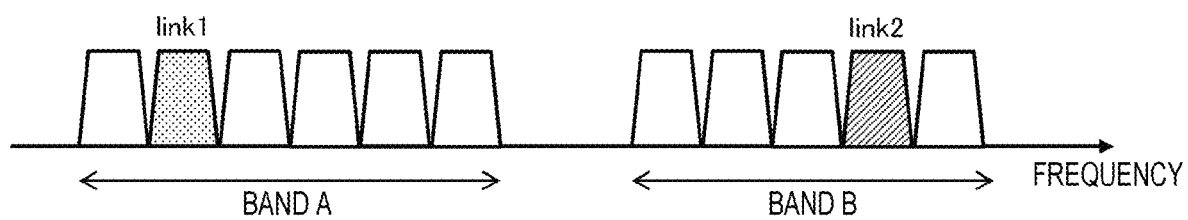
FIG. 3 is a diagram illustrating an example of channel selection of the first link (link1) and the second link (link2).

The "link" mentioned in the present specification is a wireless transmission path through which data transmission can be performed between two communication devices. The individual links are selected from among a plurality of wireless transmission paths (channels) divided, for example, in a frequency domain and independent from each other. FIGS. 2 and 3 illustrate two examples regarding channel selection of the first link (link1) and the second link (link2) used in the communication system 100. In each drawing, each of a band A and a band B is any one of bands such as a 2.4 GHz band, a 5 GHz band, a 6 GHz band, and a 920 GHz band. The band A and the band B may be, for example, an unlicensed band that does not require a radio station license, and are allowed to be used by database access such as a Spectrum Access System (SAS).

Each of the band A and the band B includes a plurality of channels. In the example illustrated in FIGS. 2 and 3, the band A includes six channels, and the band B includes five channels. The MLD such as the access point 110 and the terminal 120 operating in the communication system 100 selects channels to be used for the first link (link1) and the second link (link2) from the band A and the band B. In the example illustrated in FIG. 2, channels to be used for the first link (link1) and the second link (link2) are selected from the band A. Furthermore, in the example illustrated in FIG. 3, a channel to be used for the first link (link1) is selected from the band A, and a channel to be used for the second link (link2) is selected from the band B.

C. Device Configuration

Figure 4:
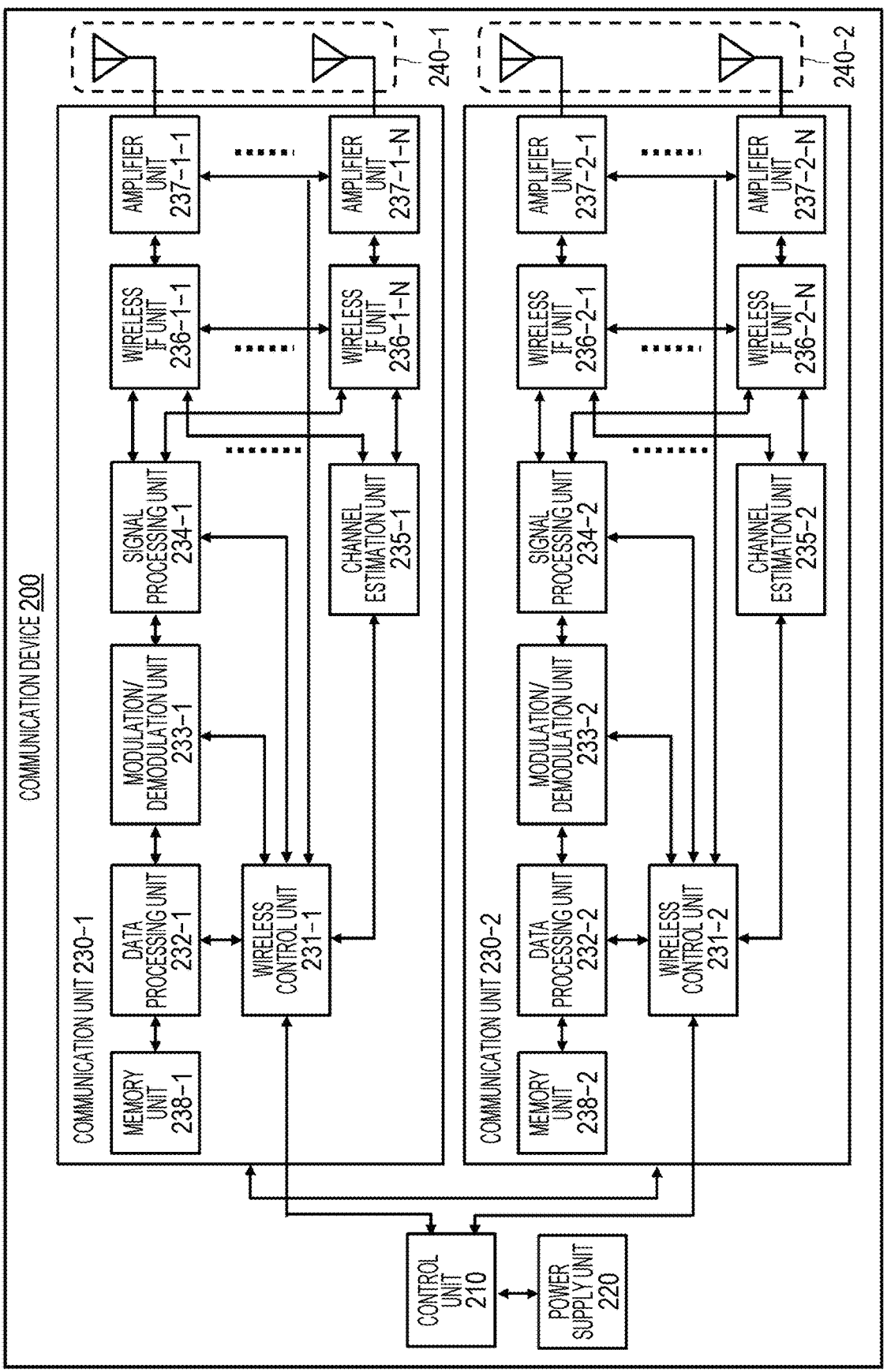
FIG. 4 is a diagram illustrating a configuration example of a communication device 200.

FIG. 4 illustrates a configuration example of the communication device 200 that can operate as the access point 110 and the terminal 120. The communication device 200 is a device or an MLO that performs a multi-link operation using a first link (link1) and a second link (link2).

The illustrated communication device 200 includes a control unit 210, a power supply unit 220, a plurality of (two in the illustrated example) communication units 230-1 and 230-2, an antenna unit 240-1 corresponding to the communication unit 230-1, and an antenna unit 240-2 corresponding to the communication unit 230-2.

The combination of the communication unit 230-1 and the antenna unit 240-1 and the combination of the communication unit 230-2 and the antenna unit 240-2 are provided for each band used by the communication device 200. In the example illustrated in FIG. 4, data communication using the first link (link1) is performed by the combination of the communication unit 230-1 and the antenna unit 240-1, and data communication using the second link (link2) is performed by the combination of the communication unit 230-2 and the antenna unit 240-2. Therefore, in a case where the communication device 200 uses three or more bands, a combination of a communication unit and an antenna unit (not illustrated) is additionally provided. The communication unit 230-1 and the communication unit 230-2 may control and exchange information with each other.

Note that, since the communication unit 230-1 and the communication unit 230-2, and the antenna unit 240-1 and the antenna unit 240-2 have the same configuration, they will be referred to as a communication unit 230 and an antenna unit 240 for simplification.

The communication unit 230 is configured by, for example, a processor such as a microprocessor and a circuit, and includes a memory unit 238, a wireless control unit 231, a data processing unit 232, a modulation/demodulation unit 233, a signal processing unit 234, a channel estimation unit 235, a plurality of wireless interface (IF) units 236-1, . . . , and 236-N arranged in parallel, and amplifier units 237-1, . . . , and 237-N connected in series to the wireless interface units 236-1, . . . , and 236-N (here, N is an integer of 2 or more. Then, each antenna element constituting the antenna unit 240 corresponding to the communication unit 230 is connected to each of the amplifier units 237-1, . . . , and 237-N.

With the wireless interface unit 236, the amplifier unit 237, and the antenna unit 240 connected in series as one set, one or more sets may be a component of the communication unit 230. In addition, the wireless interface units 236-1, . . . , and 236-N may include the functions of the corresponding amplifier units 237-1, . . . , and 237-N, respectively.

The memory unit 238 temporarily stores data (for example, transmission data) input from the upper layer of the communication protocol and provides the data to the data processing unit 232. In addition, the memory unit 236 temporarily stores data (for example, received data) delivered from the data processing unit 232 and provides the data to the upper layer of the communication protocol. That is, the memory unit 238 is used as a transmission queue or a reception queue.

Note that a part or the whole of the memory unit 238 may be arranged outside the communication unit 230. Furthermore, the memory unit 238-1 arranged in one communication unit 230-1 may he shared with another communication unit 230-2, or the memory unit 238 arranged outside the communication unit 230 may be shared by a plurality of communication units 230-1, 230-2, . . . .

At the time of transmission in which data is input from an upper layer of its own communication protocol, the data processing unit 232 generates a packet for wireless transmission from the data, further performs processing such as addition of a header for media access control (MAC) or addition of an error detection code, and provides the processed data to the modulation/demodulation unit 233. Furthermore, at the time of reception in which there is an input from the modulation/demodulation unit 233, the data processing unit 232 performs processing such as analysis of the MAC header, detection of a packet error, and packet reordering, and provides the processed data to its own protocol upper layer.

The wireless control unit 231 controls delivery of information between respective units in the communication device 200. In addition, the wireless control unit 231 performs parameter setting in the modulation/demodulation unit 233 and the signal processing unit 234, packet scheduling in the data processing unit 232, parameter setting of the wireless interface unit 236 and the amplifier unit 237, and transmission power control.

At the time of transmission, the modulation/demodulation unit 233 performs encoding, interleaving, and modulation processing on the input data from the data processing unit 232 on the basis of the encoding system and the modulation system set by the wireless control unit 231, generates a data symbol stream, and provides the data symbol stream to the signal processing unit 234. Furthermore, at the time of reception, the modulation/demodulation unit 233 performs demodulation processing, deinterleaving, and decoding processing opposite to those at the time of transmission on the input symbol stream from the signal processing unit 234, and provides data to the data processing unit 232 or the wireless control unit 231.

At the time of transmission, the signal processing unit 234 performs signal processing to be used for spatial separation on the input from the modulation/demodulation unit 233 as necessary, and provides the obtained one or more transmission symbol streams to the wireless interface units 236-1, . . . . Furthermore, at the time of reception, the signal processing unit 234 performs signal processing on the received symbol streams input from the respective wireless interface units 236-1, . . . performs spatial decomposition of the streams as necessary, and provides the streams to the modulation/demodulation unit 233.

The channel estimation unit 235 calculates complex channel gain information of the propagation path from the preamble portion and the training signal portion of the input signals from the wireless interface units 236-1, . . . . The calculated complex channel gain information is used for demodulation processing in the modulation/demodulation unit 233 and spatial processing in the signal processing unit 234 via the wireless control unit 231.

At the time of transmission, the wireless interface unit 236 converts an input from the signal processing unit 234 into an analog signal, performs filtering, up-conversion to a carrier frequency, and phase control, and transmits the resultant signal to the corresponding amplifier unit 237 or antenna unit 240. Furthermore, at the time of reception, the wireless interface unit 236 performs processing such as down-conversion, filtering, and conversion into a digital signal opposite to that at the time of transmission on the input from the corresponding amplifier unit 237 or antenna unit 240, and provides data to the signal processing unit 234 and the channel estimation unit 235.

At the time of transmission, the amplifier unit 237 amplifies the analog signal input from the wireless interface unit 236 to predetermined power and transmits the amplified analog signal to the corresponding antenna element in the antenna unit 240. Furthermore, at the time of reception, the amplifier unit 237 amplifies the signal input from the corresponding antenna element in the antenna unit 240 with low noise to predetermined power, and outputs the amplified signal to the wireless interface unit 236.

Note that at least one of the function at the time of transmission or the function at the time of reception of the amplifier unit 237 may be included in the wireless interface unit 236. Furthermore, at least one of the function at the time of transmission or the function at the time of reception of the amplifier unit 237 may be a component other than the communication unit 230.

One set of the wireless interface unit 236 and the amplifier unit 237 constitutes one radio frequency (RF) branch. It is assumed that transmission and reception of one band can be performed by one RF branch. In the device configuration example illustrated in FIG. 4, the communication unit 230 includes N RF branches.

The control unit 210 is configured by, for example, a processor such as a microprocessor and a circuit, and controls the wireless control unit 231 and the power supply unit 220. Furthermore, the control unit 210 may perform at least a part of the above-described operation of the wireless control unit 231 instead of the wireless control unit 231. In particular, in the present embodiment, the control unit 210 and the wireless control unit 231 control the operation of each unit in order to realize the operation according to each embodiment described later.

The power supply unit 220 is configured by a battery power supply or a fixed power supply, and supplies driving power to the communication device 200.

Note that the control unit 210 and the communication unit 230 can be collectively configured by one or a plurality of large scale integration (LSI).

Furthermore, while the communication device 200 is on standby, the communication unit 230 may transition to a standby state or a sleep state (alternatively, a state in which at least a part of the functions is stopped) to achieve low power consumption. In the device configuration example illustrated in FIG. 4, the communication unit 230 includes N RE branches, but may be configured to be able to transition to a standby state or a sleep state for each RF branch.

D. Operation Example 1

In Section D, a first operation example of a communication device (MLD) that performs MLO using a first link and a second link will be described. Specifically, before the start timing of the MLP, the communication device (MLD) transmits the MLP Setup frame by a plurality of links, and notifies the time (offset) from the transmission timing of the MLP Setup frame to the start timing of the MLP and the length of the MLP so that surrounding terminals suppress the transmission in a designated period. An operation in which a communication device (MLD) that performs MLO brings both the first link and the second link into an idle state to facilitate MLO by synchronous transmission will be described below.

Figure 5:
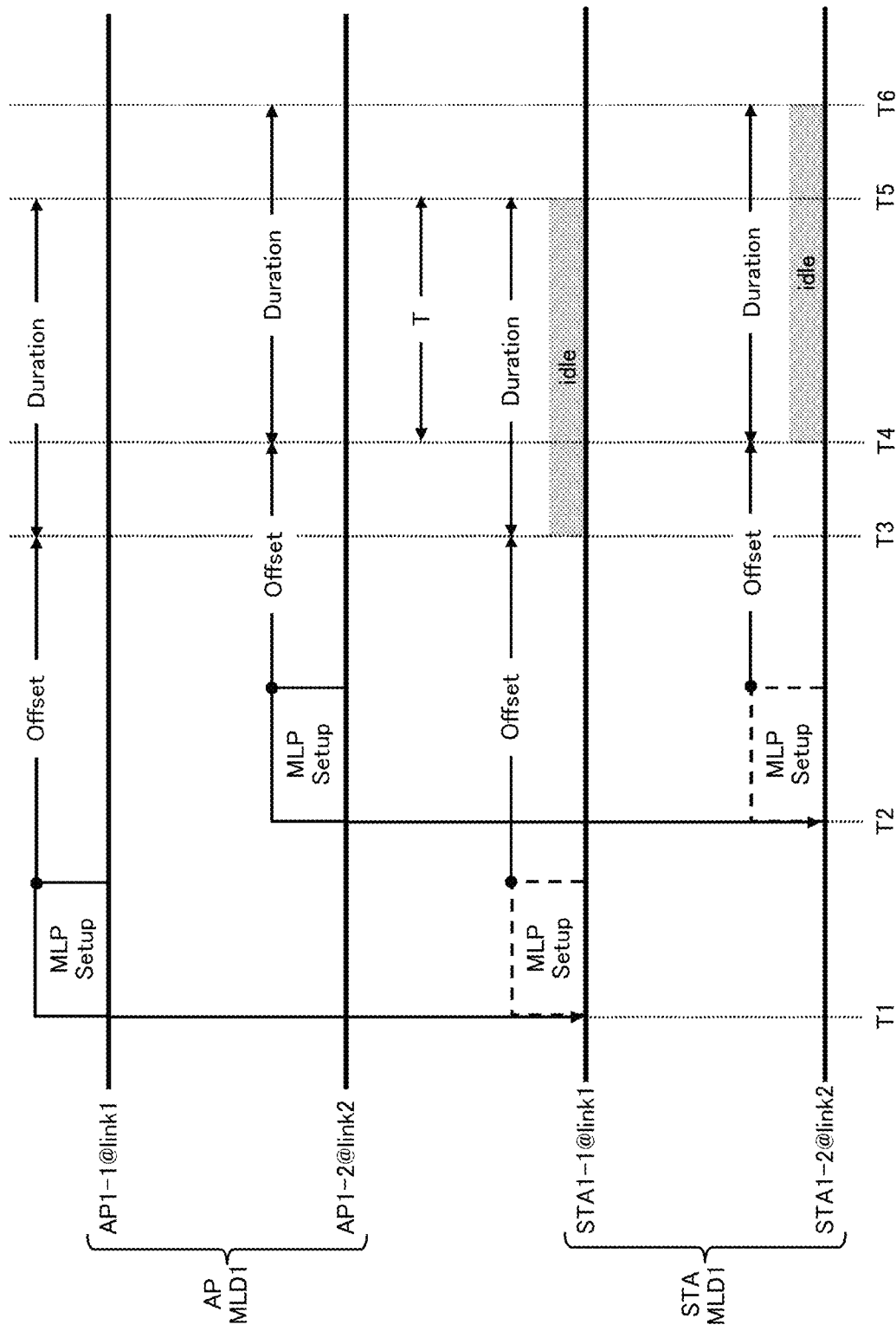
FIG. 5 is a diagram illustrating a communication. sequence example (first operation example) in which MLO is performed.

FIG. 5 illustrates a communication sequence example illustrating this operation. However, in FIG. 5, a communication system in which the first link (link1) and the second link (link2) can be used and one terminal (STA MLD) operates under the control of one access point (AP MLD1) is assumed. The AP MLD1 includes an AP1-1 operating on the first link and an AP1-2 operating on the second link. In addition, the STA MLD1 includes an STA1-1 operating on the first link and an STA1-2 operating on the second link.

Note that the horizontal axis in FIG. 5 is a time axis, and indicates a communication operation of the access point and each terminal for each time on the first link and the second link. A square block drawn by a solid line indicates a transmission frame, an arrow of a vertical solid line indicates frame transmission to a destination, and a square block drawn by a dotted line indicates a reception frame.

First, the AP1-1 of the AP ML1 transmits an MLP Setup frame at the first link (link1) at time T1 before the start timing of MLP. In addition, the AP1-2 of the AP MLD1 transmits an MLP Setup frame at the second link (link2) at time T2 that is different from time T1 and is before the start timing of MLP. Note that although not illustrated, the AP1-1 and the AP1-2 transmit the MLP Setup frame after the backoff for waiting for a random waiting time expires and a period (for example, TXOP) for occupying the channel is acquired in the first link (link1) and the second link (LINK2), respectively.

The MLP Setup frame is transmitted to suppress transmission of each terminal in the MLP period. At this time, it is preferable that the MLP Setup frame can also be received by a terminal of a surrounding overlapping BSS (OBSS). Therefore, the NLP Setup frame is transmitted as a control frame of "01" among the three classes defined by IEEE 802.11.

In the MLP Setup frame, information regarding the MLP is described. The information regarding the MLP is, for example, a link for setting the MLP, a time at which the MLP is started (an offset from a transmission timing of the frame to a start timing of the MLP), a period and the number of times of the MLP, and the like. However, the MLP Setup frame will be described later in detail.

The AP may transmit the MLP Setup frame by each link on which the MLP is performed in response to reception of the MLP Request frame requesting the MLP setting from the STA under control. However, in FIG. 5, in order to simplify the drawing, exchange of the MLP Request frames between the STA MLD1 and the AP MLD1 is omitted. For example, the STA transmits the MLP Request frame to the connection destination AP in a case where there is more than a certain amount of data in its own transmission buffer or in a case where there is a packet that cannot satisfy a latency or throughput request unless multilink transmission is performed. Capability information indicating whether or not the AP MLD and the STA MLD support the MLP setting may be exchanged in advance at the time of association or the like.

The MLP Setup frame transmitted by the AP1-1 at time T1 includes information regarding the offset until time 13 at which MLP is started and the period of MLP corresponding to the time from time T3 to time T5. Therefore, upon receiving the MLP Setup frame from the AP1-1, the STA1-1 of the STA MLD1 suppresses transmission only for a period corresponding to the Duration from time T3 to time T5. As a result, the first link (link1) is in an idle state only for the period from time T3 to time T5.

Further, the MLP Setup frame transmitted by the AP1-2 at time T2 includes information regarding the offset until time T4 at which MLP is started and the period of MLP corresponding to the time from time T4 to time 76. Therefore, upon receiving the MLP Setup frame from the AP1-2 the STA1-2 of the STA MLD1 suppresses transmission only for a period corresponding to Duration from time T4 to time T6. As a result, the second link (link2) is in the idle state only for the period from time T4 to time T6.

The AP MLD1 controls the start time and period of MLP described in the MLP Setup frame transmitted by each link such that MLP start time T3 at the first link (link1) is earlier than MLP end time T6 at the second link (link2) and MLP start time T4 at the second link (link2) is earlier than MLP end time T5 at the first link (link1).

The AP MLD1 can set the MLP for a period (period T in FIG. 5) from the latest time of the MLP start time of the first link (link1) and the MLP start time of the second link (link2) to the earliest time of the MLP end time of the first link (link3) and the MLP end time of the second link (link2), and during this period, the AP MLD1 (alternatively, the STA MLD under control that has transmitted the MLR Request frame to the AP MLD1) can preferentially transmit the multilink transmission.

The STA MLD1, which has received the MLP Setup frame from the AP MLD1, suppresses transmission only for a period specified by the Duration information from the time specified by the offset information of the frame. However, the STA MLD1 may perform transmission in a case where transmission is requested by, for example, receiving a trigger frame from the AP MLD1.

Further, in a case where the transmission power can. be set such that the reception. power at the AP MLD1 when the STA MLD1 transmits a signal by each link is equal to or less than a first threshold, the STA MLD1 may perform transmission after setting the transmission power. The first threshold is, for example, a preamble detection threshold. At this time, the AP MLD1 may describe information regarding transmission power in the MLP Setup frame so that the AP1-1 and the AP1-2 can calculate reception power when the STA MLD1 having received the MLP Setup frame transmits a signal.

The AP MLD1 may transmit the MLP Setup frame in which the MLP period is described in the Duration/ID field at the start of MLP so that a legacy terminal or the like that cannot correctly decode the MLP Setup frame can also suppress transmission during MLP.

Further, the AP MLD1 (alternatively, the STA MLD under control that has requested the AP MLD1 to set MLP) may transmit the MLP END frame and cancel the MLP set to the surrounding terminals in a case where it becomes unnecessary to perform the multi-link transmission or it becomes impossible to set the MLP of the same period at each link during the MLP.

E. Frame Format

Figure 6:
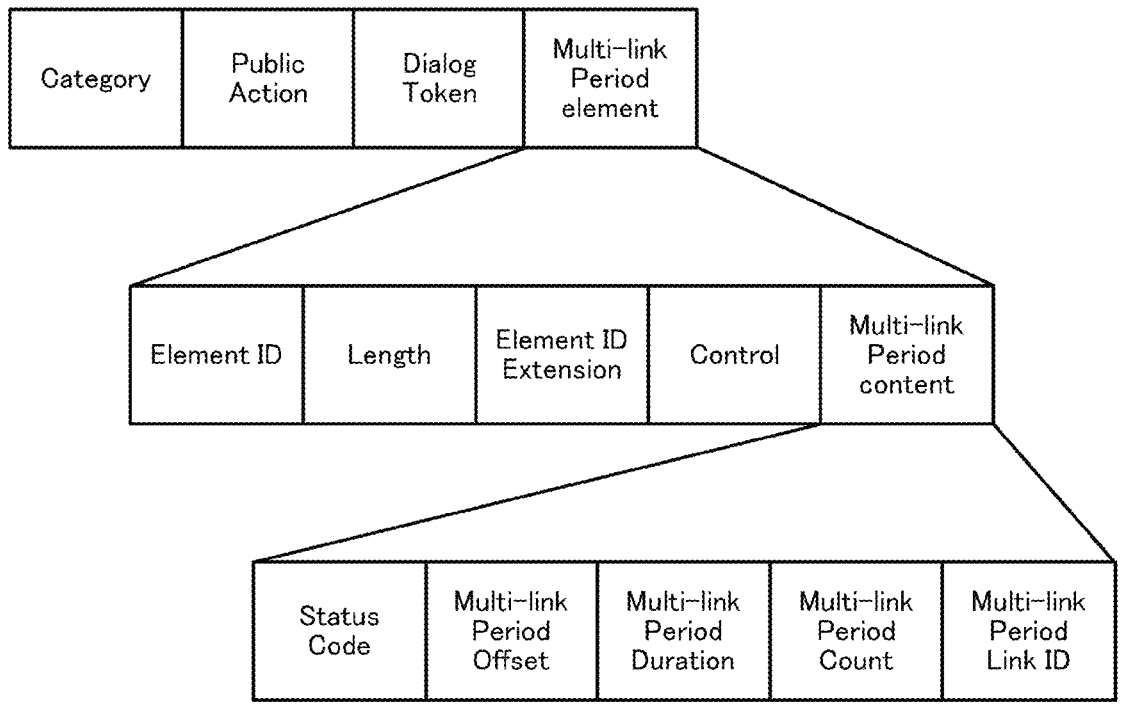
FIG. 6 is a diagram illustrating an exemplary format of an MLP Setup frame.
Figure 7:
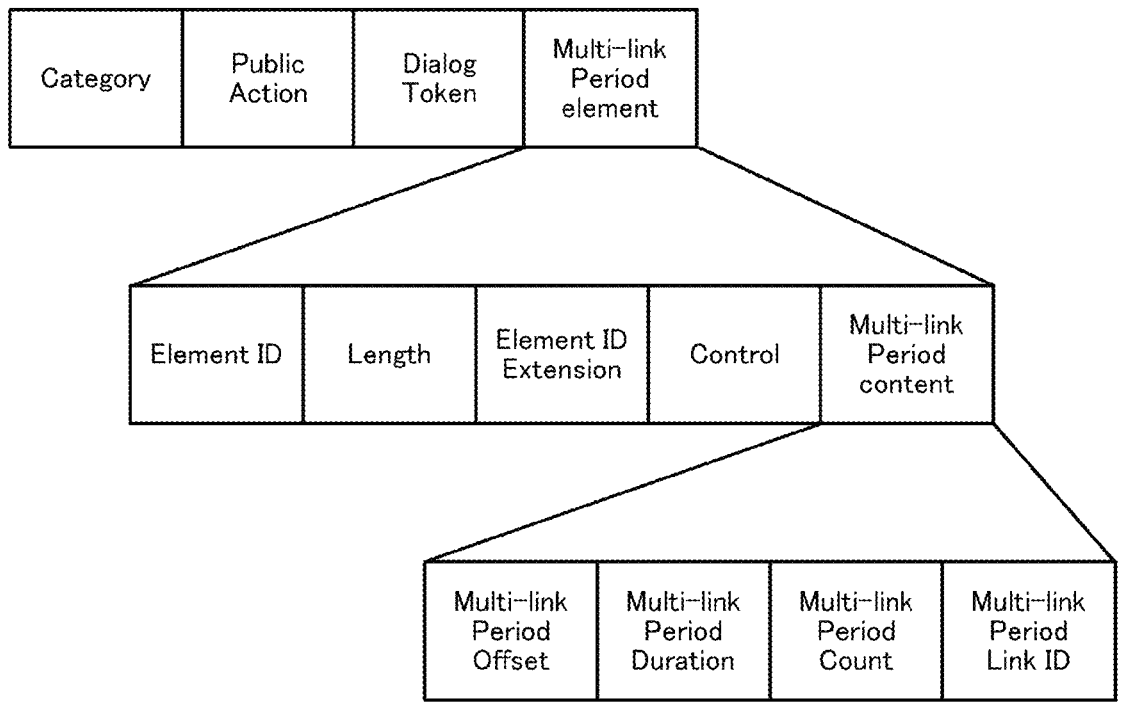
FIG. 7 is a diagram illustrating an exemplary format of an MLP Request frame.

In this section E, the format. of the main frame used in the first operation example related to the MLO will be described. FIGS. 6 to 8 illustrate format examples of the MLP Setup frame, the MLP Request frame, and the MLP End frame, respectively. Hereinafter, information described in the fields included in each frame will be described.

In the Category field, information indicating a category of a corresponding frame is described. For example, information indicating that the frame is a Public Action frame is described.

In the Public Action field, information indicating that the corresponding frame is a frame related to MLP setting among the Public Action frames is described.

In the Dialog Token field, the same value is described in the corresponding MLP Request frame, the MLP Setup frame, and the MLP End frame, thereby being used to associate the corresponding frame with the corresponding MLP Request frame, the MLP Setup frame, and the MLP End frame.

The Multi-link Period element field includes fields of Element ID, Length, Element ID Extension, and Control.

In the Element ID field and the Element ID Extension field, information indicating a Multi-link Period Element is described.

In the control field, information for distinguishing whether the corresponding frame is an MLP Request frame, an MLP Setup frame, or an MLP End frame is described.

The Multi-link Period content field of the MLP Setup frame and the MLP Request frame includes a Multi-link Period Offset field, a Multi-link Period Duration field, a Multi-link Period Count field, and a Multi-link Link ID field. In addition, the Multi-link Period content field of the MLP Setup frame further includes a Status Code.

In the Status Code, information regarding a result (whether setting is allowed or rejected, or the like) of the MLP setting requested by the Multi-link Request frame is described.

In the Multi-link Period Offset field, information regarding a time at which MLP is started is described. The start time may be indicated by an absolute time, or may be indicated by relative time information from a certain reference point to the start of MLP. The reference point is, for example, the following TBTT (Target Beacon Transmission Time). The relative time information is described with a granularity such as, for example, a time unit (TU, in units of 1024 microseconds).

In the Multi-link Period Duration field, information indicating the length of MLP is described. The length information is described with a granularity such as, for example, in units of 32 microseconds.

In the Mufti-link Period Count field, information indicating how many times the corresponding MLP Setup frame has been transmitted is described. An operation of transmitting the MLP Setup frame a plurality of times will be described later.

In the Multi-link Period Link ID field, information regarding a link for setting MLP is described.

In a case of having received the MLP Setup frame by at least one of the links being used, the communication device (MLP) that performs MLO may operate to set the MLP regardless of whether or riot the MLP Setup frame has been received by another link. Alternatively, the communication device (MLD) that performs MLO may operate to set the MLP only in a case of having received the MLP Setup frame by all the links described in the Multi-link Period Link ID field of the MLP Setup frame. The AP may instruct the STA under control with the MLP Setup frame or the like which method is used to set the MLP, or may set the method at the time of exchanging the Capability information regarding the MLP setting at the time of association.

The AP may perform negotiation on setting of a Multi-link Period with surrounding APs. At this time, the AP transmits the MLP Advertisement frame, thereby notifying the surrounding APs of the information regarding the MLP that the AP itself has already transmitted the MLP Setup frame and has set for the STA under control, and the information regarding the MLP that the AP has not yet transmitted the MLP Setup frame but is scheduled to set in the future.

The AP having received the MLP Advertisement frame from another AP, returns an MLP Advertisement Response frame describing whether or not to permit the content of each setting of the MLP described in the received frame. The negotiation for the MLP setting may be performed for each link, or the negotiation for the setting of all links may be performed by one link.

FIG. 9 illustrates a format of the MLP Advertisement frame. Description of fields common to the frame formats illustrated in FIGS. 6 to 8 is omitted here.

In the Number of Reported MLP Reservations field, the number of MLPs that the AP that is the transmission source of the frame has already transmitted the MLP Setup frame and set in the SPA under control is described.

In the Number of Pending MLP Reservations field, the number of MLPs that the AP that is the transmission source of the frame is scheduled to transmit the MLP Setup frame and set in the STA under control in the future is described.

In the Active MLP Reservations field, information regarding the start time and period of each MLP that the AP that is the transmission source of the frame has already transmitted the MLP Setup frame and set in the STA under control is described.

In the Pending MLP Reservations field, information regarding the start time and period of each MLP that the AP that is the transmission source of the frame is scheduled to set in the SPA under control in the future is described.

In the Active MLP Reservations field and the Pending MLP Reservations field, information regarding the start time and the period of each MLP may be notified by, for example, a Transmission Opportunity (TXOP) Reservation field already defined in the standard. In the TXOP Reservation field, there are fields of Duration, Service Interval, and Start Time. In the Duration field, MLP period information is described. In the Service Interval field, information regarding a time interval from an MLP set immediately before is described. In the START Time field, information regarding a time at which MLP is started is described. Similarly to the MLP setup frame, the time information for starting the MLP may be indicated by an absolute time or may be indicated by relative time information from a reference point such as TBTT.

FIG. 10 illustrates a format example of the MLP Advertisement Response frame. The AP, when having received the MLP Advertisement frame from a surrounding AP, returns an MLP Advertisement Response frame. Description of fields common to the frame formats illustrated in FIGS. 6 to 8 is omitted here.

In the Status Code field, information indicating whether or not setting of each MLP described in the received MLP Advertisement frame is allowed is described.

The Schedule Conflict field is prepared only in a case where the MLP setting is not allowed, and describes information indicating which MLP described in the MLP Advertisement frame cannot be allowed.

The Alternate Schedule field is also prepared only in a case where the MLP setting is not allowed, and describes information regarding the start time and the period of the MLP that can be set instead of the MLP indicated in the Schedule Conflict field. The Alternate Schedule field may also be described by using the TXOP Reservation field, similarly to the Active MLP Reservations field of the MLP Advertisement frame.

F. Modification of Operation Example 1

Figure 11:
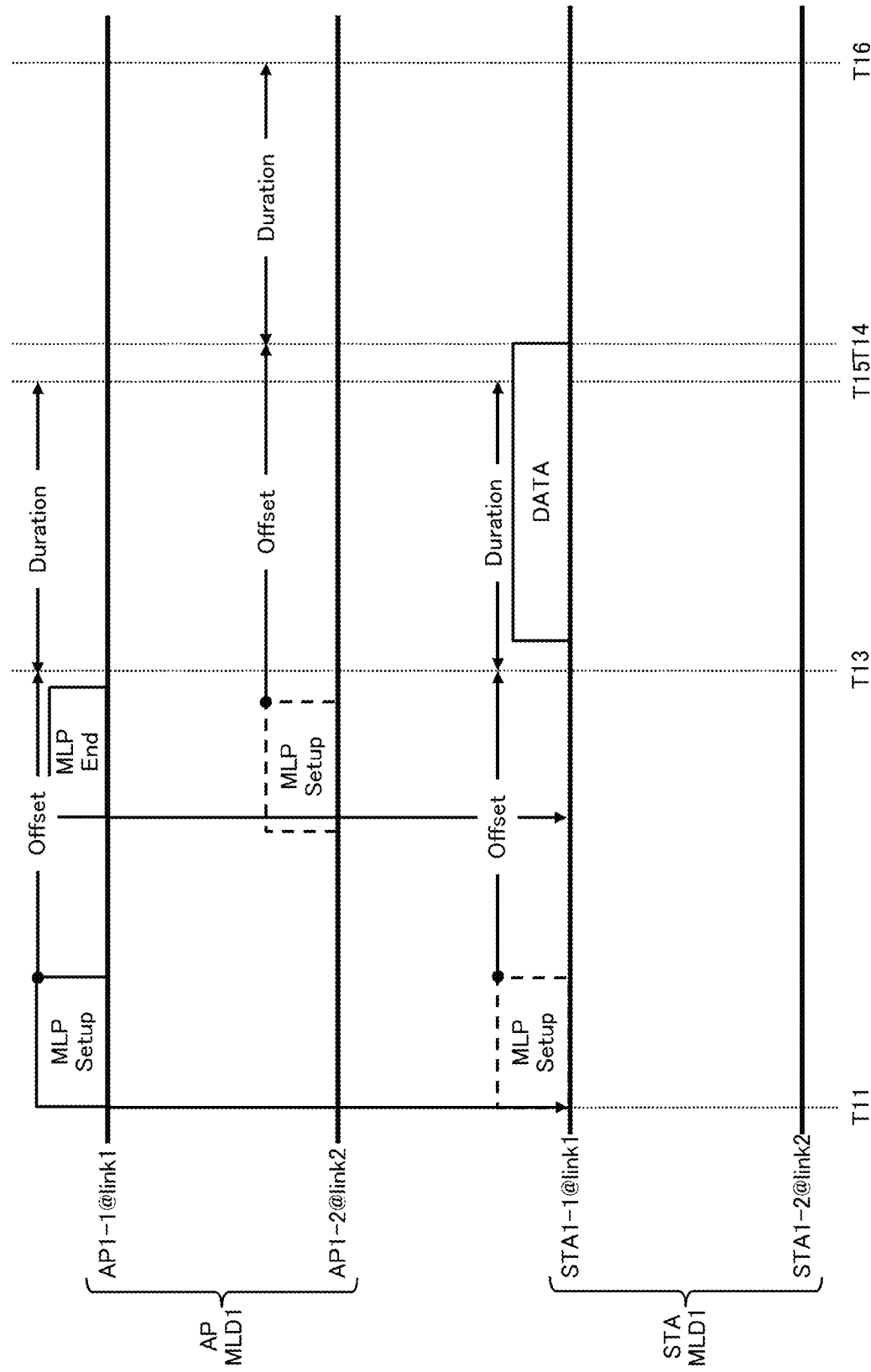
FIG. 11 is a diagram illustrating a communication sequence example (modification of the first operation example) in which MLO is performed.

FIG. 11 illustrates a communication sequence example in a case where the MLP start time of the second link is set after the MLP end time of the first link in the first operation example. Similarly to the operation example illustrated in FIG. 5, FIG. 11 also assumes a communication system in which one terminal (STA MLD) operates under control of one access point (AP MLD1). The AP MLD1 includes an AP1-1 operating on the first link and an AP1-2 operating on the second link. In addition, the STA MLD1 includes an STA1-1 operating on the first link and an STA1-2 operating on the second link. In addition, the horizontal axis is a time axis, and indicates a communication operation for each time on the first link and the second link of the access point and each terminal. A square block drawn by a solid line indicates a transmission frame, an arrow of a vertical solid line indicates frame transmission to a destination, and a square block drawn by a dotted line indicates a frame that has not been transmitted and a reception frame.

First, the AP1-1 of the AP MLD1 transmits an MLP Setup frame at the first link (link1) at time T11 before the start timing of MLP. Then, on the basis of the information regarding the start time and period of the MLP described in the MLP Setup frame received from the AP1-1, when time T13 arrives, the STA1-1 of the STA MLD1 suppresses transmission only for a period corresponding to Duration up to time T15.

On the other hand, in a case where the MLP Setup frame cannot be transmitted by the second link (link2) until a certain time after the AP1-1 transmits the MLP Setup frame by the first link (link1), even if the AP1-2 of the AP MLD1 transmits the MLP Setup frame by the second link (link2), the MLP start time at the second link (link2) is later than the MLP end time 115 at the first link (link1). In such a case, it is not possible to set a time during which the first link (link3) and the second link (link2) are simultaneously in the idle state.

In a case where the AP MLD1 learns that the MLP Setup frame cannot be transmitted by the second link (link2) until a certain time and thus it is not possible to set a time during which the first link (link1) and the second link (link2) are simultaneously in the idle state, the AP MLD1 prevents the AP1-2 from transmitting the MLP Setup frame by the second link (link2). Further, the AP1-1 may transmit the MLP End frame indicating that MLP has been canceled in order to prevent surrounding terminals from unnecessarily suppressing transmission only by the MLP Setup frame by the first link (link1) (that is, even though MLO is not performed). In the example illustrated in FIG. 11, the AP1-1 transmits the MLP End frame before the start time T13 of the MLP described in the MLP Setup frame.

When the STA1-1 receives the MLP End frame received from the AP1-1 and detects that the MLP has been canceled, the STA1-1 can perform transmission of a data frame (DATA) or the like without suppressing the transmission in the period of Duration from time T13 to time T15.

Alternatively, the AP MLD1 may perform control such that the AP1-2 transmits the MLP Setup frame by the second link instead of canceling the MLP. In this case, the AP1-1 transmits the MLP Setup frame describing information regarding an appropriate start time and period of MLP by the first link (link1) so that surrounding terminals suppress transmission also by the first link (link1) in the period of Duration set by the second link (link2) by the MLP Setup frame.

G. Operation of Communication Device

In this section G, the operation of the communication device (MLD) for realizing the first operation example related to the MLO will be described.

Figure 12:
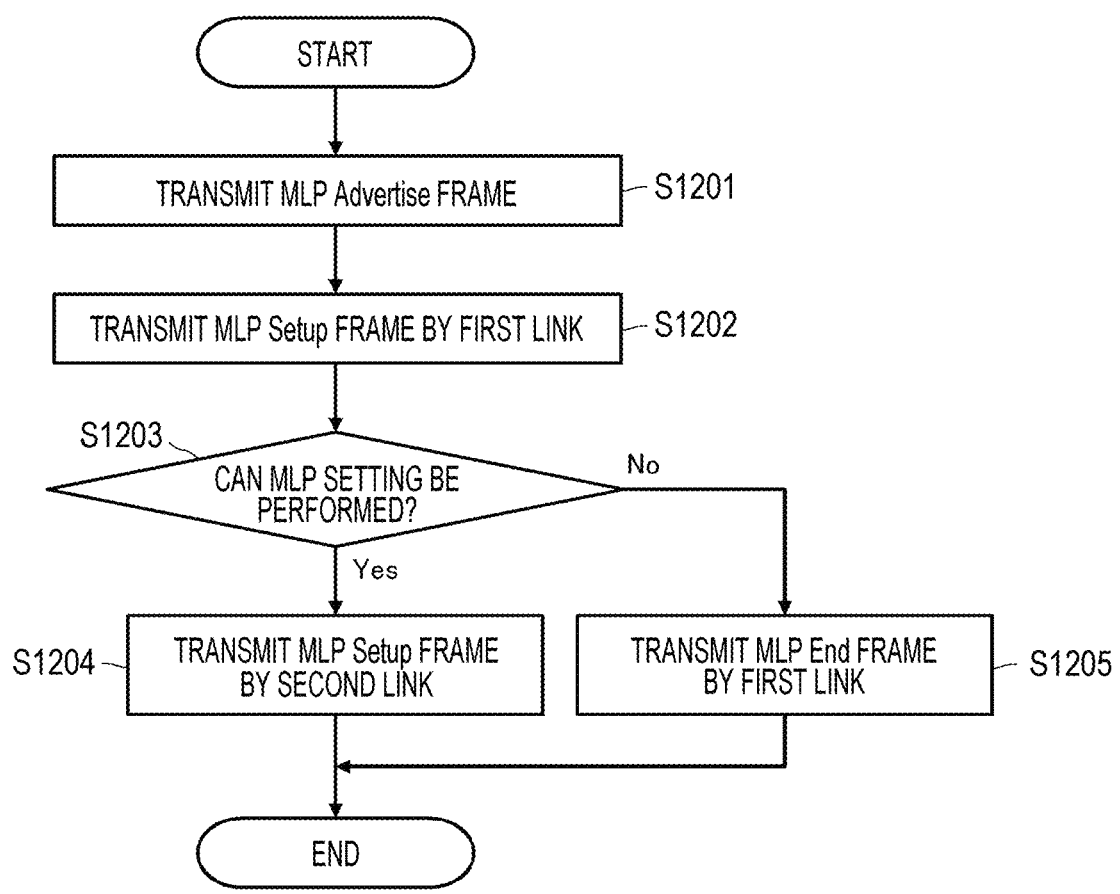
FIG. 12 is a flowchart illustrating a processing. procedure executed when a communication device (MLD) operating as an AP performs MLO.

FIG. 12 illustrates a processing procedure executed when the communication device (MLD) operating as the AP performs the MLP setting in the form of a flowchart. However, it is assumed that the communication device (HIM has the configuration illustrated in FIG. 4.

First, the AP transmits an MLP Advertisement frame (or receives an MLP Advertisement frame from a surrounding AP), and performs negotiation for setting a Multi-link Period with surrounding APs (step S1201). Note that, from the surrounding AP having received the MLP Advertisement frame, an MLP Advertisement Response frame is returned.

Here, it is assumed that, as a result of performing negotiation with the surrounding APs, the AP decides to set MLP using the first link and the second link.

Then, when acquiring a transmission right by the first link, the AP transmits an MLP Setup frame at the first link (step S1202).

Then, when the AP obtains the transmission right also at the second link, the AP transmits an MLP Setup frame at the second link at this time and checks whether or not MLP setting can be performed. Specifically, the AP checks whether or not the start time and the period of MLP described in the MLP Setup frame transmitted by the second link can be controlled such that the MLP start time (corresponding to time T4 in FIG. 5) by the second link is earlier than the MLP end time (corresponding to time T5 in FIG. 5) by the first link (step S1203).

Here, in a case where the MLP setting can be performed with the MLP start time by the second link earlier than the MLP end time by the first link (Yes in step S1203), the AP transmits the MLP Setup frame also by the second link, cancels the MLP (step S1205), and ends the present processing.

On the other hand, in a case where the MLP start time by the second link cannot be made earlier than the MLP end time by the first link and the MLP setting cannot be performed, the AP transmits the MLP End frame also by the first link (step S1205) and ends the present processing.

Figure 13:
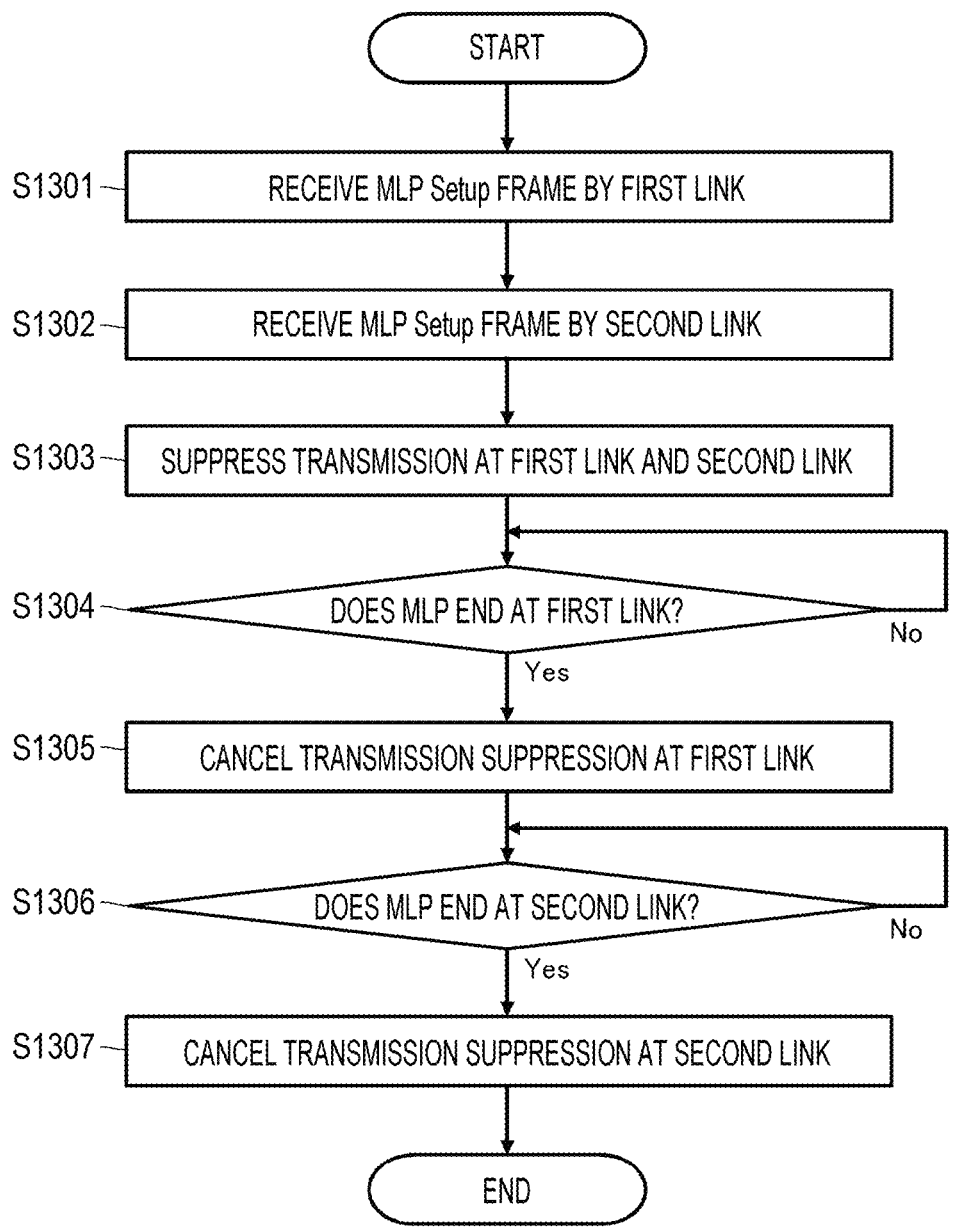
FIG. 13 is a flowchart illustrating a processing procedure executed by a communication device (MLD) operating as an STA when MLO is performed.

FIG. 13 illustrates, in the form of flowchart, a processing procedure (processing procedure for suppressing transmission in order for the surrounding terminals to perform MLO) executed by the communication device (MLD) operating as an STA. However, it is assumed that the communication device (MLD) has the configuration illustrated in FIG. 4.

When having received the MLP Setup frame by the first link from the connection destination AP (step S1301) and then having received the MLP Setup frame by the second link (step S1302), the STA starts suppression of transmission at the first link and the second link on the basis of the start time and the period of MLP described in the MLP Setup frame received at each link (step S1303).

Thereafter, when the MLP end time based on the description content of the MLP Setup frame received by the first link arrives (Yes in step S1304), the STA cancels the transmission suppression at the first link (step S1305).

Further, when the MLP end time based on the description content of the MLP Setup frame received by the second link arrives (Yes in step S1306), the STA cancels the transmission suppression at the second link (step S1307) and ends the present processing.

The operation of the communication device (MLD) illustrated in FIGS. 12 and 13 can be realized as follows (1) to (4).

(1) An AP MLD supporting MLP is referred to as an MLP AP MLD, and sets a MLP Support field of an Extreme High Throughput (EHT) Capabilities element transmitted by the MLP AP MLD to 1. In a case where the AP MLD does not support MLP, set the MLP Support field to 0.

(2) A non-AP MLD supporting MLP is referred. to as an MLP non-AP MLD, and sets the MLP Support field of the EHT Capabilities element transmitted by the MLP non-AP MLD to 1. In a case where the non-AP MLD does not support MLP, set the MLP Support field to 0.

(3) The MLP non-AP MLD may request the MLP AP MLD of a connection destination to set MLP. The MLP non-AP MLD requesting to set MLP may transmit an MLP Request frame indicating an MLP Request subtype in the Control field of the Mufti-link Period element. The MLP AP MLD requesting to set MLP transmits an MLP Setup frame indicating an MLP Setup subtype in the Control field of the Multi-link Period element. The MLP Setup frame indicates a start time, a period, and a link ID of the MLP (see FIG. 6).

(4) When determining to set MLP, the MLP AP MLD or the MLP non-AP MLD stops the subtraction of the backoff counter from the start time of MLP, and resumes the subtraction of the backoff counter when the MLP ends.

H. Operation Example 2

In this section H, a second operation example of the communication device (MLD) that performs MLO using the first link and the second link will be described. Specifically, before the start timing of the MLP, the communication device (MLD) transmits the MLP Setup frame by a plurality of links, and notifies the time (offset) from the transmission timing of the MLP Setup frame to the start timing of the MLP and the length of the MLP so that surrounding terminals suppress the transmission in a designated period. In this operation example, the AP transmits the MLP Setup frame a plurality of times by each link in order to cause the surrounding terminals to set the MLP more reliably. At this time, the AP can set the MLP of the period in which the transmission suppression is commonly set for the surrounding terminals by each link by all the MLP Setup frames transmitted at each link, and can preferentially perform the multi-link transmission.

Figure 14:
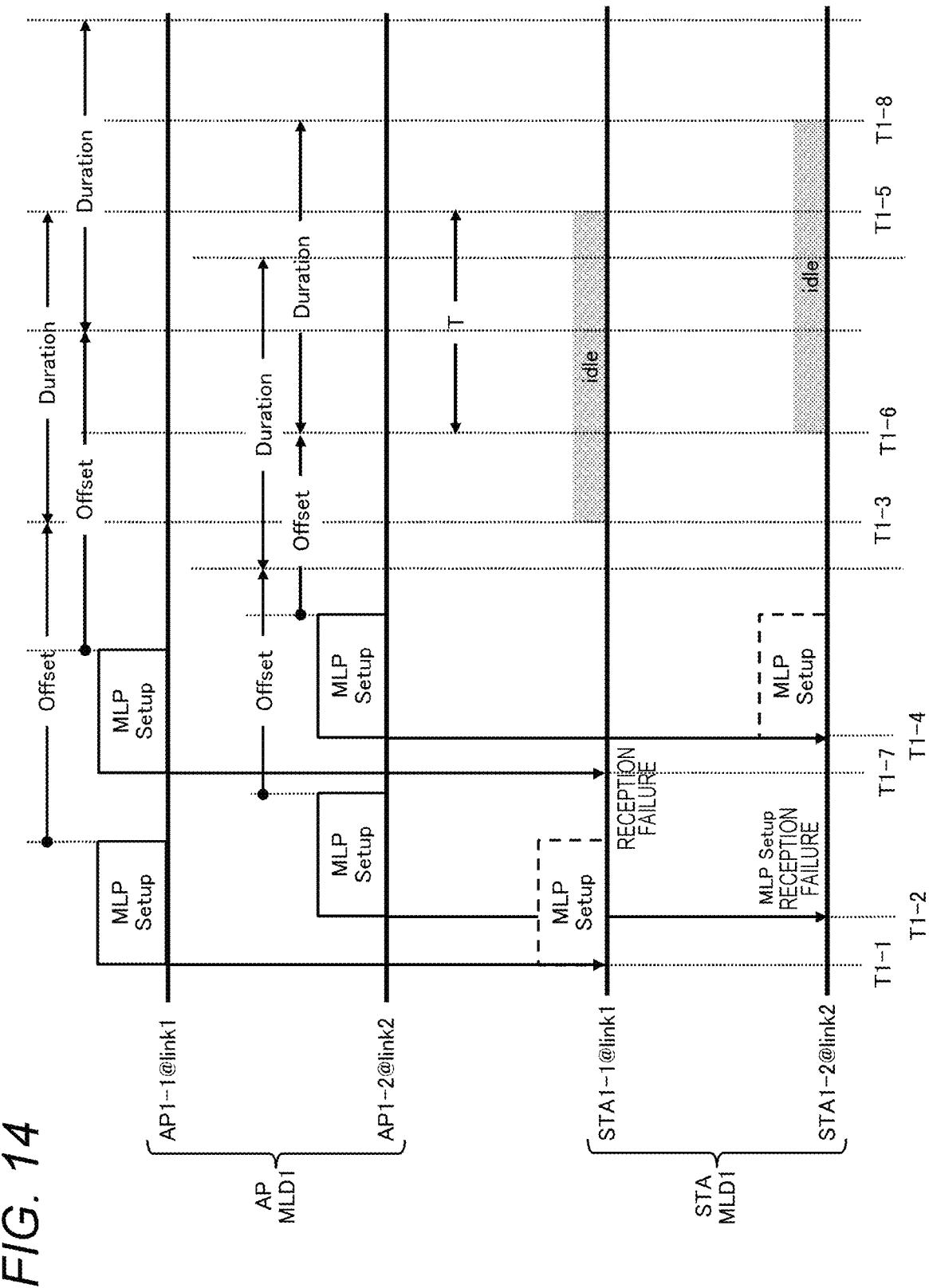
FIG. 14 is a diagram illustrating a communication sequence example (second operation example) in which MLO is performed.

FIG. 14 illustrates a communication sequence example illustrating this operation. However, in FIG. 14, a communication system in which the first link (link1) and the second link (link2) can be used and one terminal (STA MLD) operates under the control of one access point (AP MLD1) is assumed. The AP MLD1 includes an AP1-1 operating on the first link and an AP1-2 operating on the second link. In addition, the STA MLD1 includes an STA1-1 operating on the first link and an STA1-2 operating on the second link. In addition, a horizontal axis in FIG. 14 is a time axis, and indicates a communication operation for each time on the first link and the second link of the access point and each terminal. A square block drawn by a solid line indicates a transmission frame, an arrow or a vertical solid line indicates frame transmission to a destination, and a square block drawn by a dotted line indicates a reception frame.

First, the AP1-1 of the AP MLD1 transmits a first MLP Setup frame at the first link (link1) at time T1-1 before the start timing of MLP. In the information of the start time and the period of the MLP described in the MLP Setup frame transmitted for the first time, the MLP starts at time T1-3 and ends at time T1-5. The STA1-1 of the STA MLD1 succeeds in receiving the first MLP Setup frame, and suppresses transmission during a period from time T1-3 to time T1-5 designated as the MLP period, so that the first link (link1) is in an idle state.

Subsequently, the AP1-1 of the AP MT performs the second MLP Setup frame transmission at the first link (link1) at time T1-7 before the start timing of MLP. However, the STA1-1 of the STA. MLD1 fails to receive the MLP Setup frame transmitted for the second time, and thus does not suppress the transmission by the second MLP Setup frame.

Further, the AP1-2 of the AP MLD1 transmits the first MLP Setup frame at the second link (link2) at time T1-2 before the start timing of MLP. However, the STA1-1 of the STA MLD1 fails to receive the MLP Setup frame transmitted. for the first time, and thus does not suppress the transmission by this MLP Setup frame.

Subsequently, the AP1-2 of the AP MLD1 transmits the second MLP Setup frame at the second link (link2) at time T1-4 before the start timing of MLP in the information of the start time and period of the MLP described in the MLP Setup frame transmitted for the second time, the MLP starts at time T1-6 and ends at time T1-8. The STA1-2 of the STA MLD1 succeeds in receiving the second MLP Setup frame, and suppresses transmission during a period from time T1-6 to time T1-8 designated as the MLP period, so that the second link (link1) is in an idle state.

The AP MLD1 can set MLP during a period (period T in FIG. 14) from the latest time of the MLP start time of the first link (link1) and the MLP start time of the second link (link2) to the earliest time of the MLP end time of the first link (link') and the MLP end time of the second link (link2), and the AP MLD1 (alternatively, the STA MLD under control that has transmitted the MLP Request frame to the AP MLD1) can preferentially transmit the multilink transmission during the period.

Figure 15:
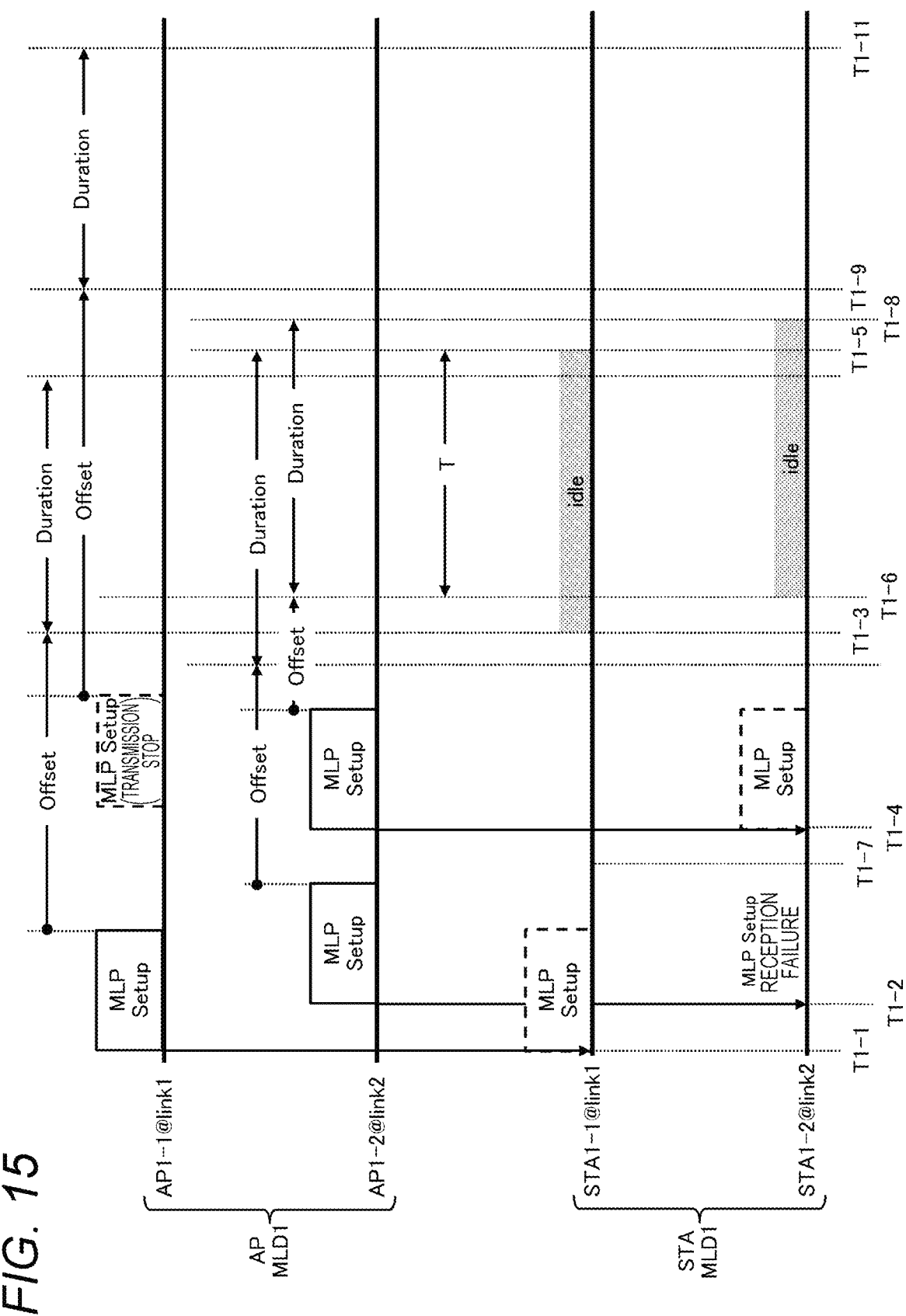
FIG. 15 is a diagram illustrating a communication sequence example (second operation example) in which MLO is performed.

In the second operation example, the AP transmits the MLP Setup frame a plurality of times by each link so that the MLP is more reliably set in the surrounding terminals. However, a completely different (no overlapping period) MLP can be set by each MLP Setup frame transmitted by the AP at a certain link. FIG. 15 illustrates an exemplary communication sequence in this case.

In the exemplary communication sequence illustrated in FIG. 15, the AP1-1 of the AP MLD1 transmits the first MLP Setup frame at the first link (link1) at time T1-1 before the start timing of MLP. In the information of the start time and period of the MLP described in the MLP Setup frame transmitted for the first time, the MLP starts at time T1-3 and ends at time T1-5. Further, it is assumed that it takes time for the AP1-1 to transmit the MLP Setup frame for the second time at the first link (link1), and the start time of MLP set by the second MLP Setup frame is T1-9 and the end time is T1-11.

Here, in a case where the start time T1-8 of the MLP set by the second MLP Setup frame is later than the end time T1-5 of the MLP set by the MLP Setup frame transmitted for the first time, the AP1-1 stops transmitting the second MLP Setup frame. This is because, even if the MLP Setup frame is transmitted a plurality of times to designate a period of Duration that does not overlap at all, surrounding terminals do not reliably set MLP, and it is useless.

The AP MLD1 may perform the MLO in the period of the MLP assumed to be set by the MLP Setup frame transmitted before the first MLP Setup frame assuming that the MLP is correctly set in the surrounding terminals by the first MLP Setup frame at the first link (link1), for example, in a case where the MLP Setup frame has already been transmitted a certain threshold number of times or more.

Alternatively, in a case where there is a terminal that has not correctly received the first MLP Setup frame at the first link (link1), and it is assumed that there is a terminal that performs transmission at the first link (link') in the MLP period (in the example illustrated in FIG. 15, a period from time T1-3 to time T1-5) designated by the first MLP Setup frame, the AP1-1 may transmit the MLP End frame by the first link (link1), and cancel the MLP set by the terminal that has correctly received the first MLP Setup frame.

For example, in a case where the STA has received the MLP Setup frame associated with the value of a Dialog Token a predetermined number of times or more, and has received an MLP Setup frame for setting a completely different MLP although the Dialog Token is the same, the STA may set the MLP on the basis of the MLP Setup frame received in the past without setting the MLP by the MLP Setup frame. In a case where the MLP Setup frame has not been received the predetermined number of times or more, the STA may discard the information of the past MLP Setup frame.

I. Effects

Effects brought by the present disclosure will be summarized.

(1) The communication device (MLD) transmits an MLP Setup frame by a plurality of links at which MLO is to be performed. Since the surrounding terminals set MLP on the basis of the information described in the received MLP Setup frame and suppress transmission, it is easy to perform multi-link operation by synchronous transmission.

(2) The AP exchanges information regarding the MLP setting by transmitting and receiving the MLP Advertisement frame and the MLP Advertisement Response frame to and from surrounding APs. Therefore, MLP can be efficiently set between surrounding APs.

INDUSTRIAL APPLICABILITY

The present disclosure has been described in detail above with reference so specific embodiments. However, it is obvious that those skilled in the art can make modifications and substitutions of the embodiments without departing from the gist of the present disclosure.

For example, by applying the present disclosure to a wireless LAN system conforming to the IEEE 802.11 standard, a communication device (MLD) that implements a multi-link function can easily perform MLO by synchronous transmission, and can achieve a high throughput.

In short, the present disclosure has been described in the form of exemplification, and the contents described in the present specification should not be interpreted in a Limited manner. In order to determine the gist of the present disclosure, the claims should be taken into consideration.

Note that the present disclosure can also have the following configurations.

(1) A communication device including:
a communication unit that performs communication by a plurality of links; and
a control unit that controls a communication operation by the communication unit, in which
the control unit performs control to transmit a signal including information regarding a period in which data transmission is performed by the plurality of links.

(2) The communication device according to (1), in which
the information regarding the period includes at least one piece of information of a start time of the period, a time length of the period, and a link for performing transmission in the period.

(3) The communication device according to (1) or (2), in which
the control unit performs control to transmit the signal by each link used for the data transmission.

(4) The communication device according to any one of (1) to (3), in which
the control unit controls description of information regarding a start time of the period and a time length of the period such that the periods overlap in each link used for the data transmission.

(5) The communication device according to any one of (1) to (4), in which
the control unit performs control to transmit the signal in response to reception of signal requesting setting of the period.

(6) The communication device according to any one of (1) to (5), in which
the control unit performs control to transmit a signal for canceling setting of the period.

(7) The communication device according to (6), is which
the control unit performs control to transmit a signal for canceling setting of the period in a case where the periods cannot be overlapped in each link used for the data transmission.

(8) The communication device according to any one of (1) to (7), in which
the control unit performs control to transmit a signal for exchanging information regarding setting of the period.

(9) The communication device according to (8), in which
the control unit performs control to return a signal including propriety regarding setting of the period described in the signal for exchanging in response to reception of the signal for exchanging.

(10) A communication method of a communication device that performs communication by a plurality of links, the communication method including the steps of:
setting a period in which data transmission is performed by the plurality of links; and
transmitting a signal including information regarding the period.

(11) A communication device including:
a communication unit that performs communication by at least one of a plurality of links; and
a control unit that controls a communication operation by the communication unit, in which
the control unit performs control to receive a signal including information regarding a period in which data transmission is performed by the plurality of links by at least one of the plurality of links and suppress transmission at a link at which the signal including the information regarding the period is received.

(12) The communication device according to (11), in which
the information regarding the period includes at least one piece of information of a start time of the period, a time length of the period, and a link for performing transmission in the period.

(13) The communication device according to (12), in which
the control unit performs control co suppress transmission at a link at which the signal has been received on the basis of the start time of the period and the time length of the period described in the signal.

(14) The communication device according to any one of (11) to (13), in which
the control unit performs control to transmit a signal requesting setting of the period.

(15) The communication device according to any one of (11) to (14), in which
the control unit does not perform suppression of transmission based on a signal including information regarding the period in response to reception of a signal for canceling setting of the period.

(16) A communication method of a communication device that performs communication by a plurality of links, the communication method including the steps of:
- receiving a signal including information regarding a period in which data transmission is performed by the plurality of links by at least one of the plurality of links; and
- suppressing transmission at a link at which the signal including information regarding the period has been received.

REFERENCE SIGNS LIST

100 Communication system
110 Access point
120 Terminal
200 Communication device
210 Control unit
220 Power supply unit
230 Communication unit
231 Wireless control unit
232 Data processing unit
233 Modulation/demodulation unit
234 Signal processing unit
235 Channel estimation unit
236 Wireless interface unit
237 Amplifier unit
238 Memory unit
240 Antenna unit

The invention claimed is:

1. A device configured to control operations of a communication device, the device comprising:
control circuitry configured to control a transceiver of the communication device to transmit a signal to each of a plurality of other communication devices via a respective link of a plurality of links, each signal including information regarding a link-specific period where a respective one of the plurality of other communication devices is to suppress communications on the respective link so that another communication device is able to perform multi-link operations via the plurality of links in a specific period of time,
wherein the information regarding the link-specific period comprises:
a link-specific suppression start time, and
a link-specific suppression duration, and
wherein the control circuitry sets the link-specific suppression start time and the link-specific suppression duration for each of the plurality of links so that the link-specific durations of the plurality of links overlap in time for the specific period of time.

2. The device according to claim 1, wherein the control circuitry controls the transceiver to:
receive a request from the another communication device for setting the specific period of time for the multi-link operations; and
in response to the request, transmit the signal to each of the plurality of other communication devices.

3. A control method of a device configured to control operations of a communication device, the control method comprising:
receiving a request from another communication device for setting a specific period of time for multi-link operations; and
in response to the request, controlling a transceiver of the communication device to transmit a signal to each of a plurality of other communication devices via a respective link of a plurality of links, each signal including information regarding a link-specific period where a respective one of the plurality of other communication devices is to suppress communications on the respective link so that another communication device is able to perform multi-link operations via the plurality of links in a specific period of time,
wherein the information regarding the link-specific period comprises:
a link-specific suppression start time, and
a link-specific suppression duration, and
wherein the link-specific suppression start time and the link-specific suppression duration are set for each of the plurality of links so that the link-specific durations of the plurality of links overlap in time for the specific period of time.

4. A communication device comprising:
a transceiver; and
control circuitry configured to control the transceiver to transmit a signal to each of a plurality of other communication devices via a respective link of a plurality of links, each signal including information regarding a link-specific period where a respective one of the plurality of other communication devices is to suppress communications on the respective link so that another communication device is able to perform multi-link operations via the plurality of links in a specific period of time,
wherein the information regarding the link-specific period comprises:
a link-specific suppression start time, and
a link-specific suppression duration, and
wherein the control circuitry sets the link-specific suppression start time and the link-specific suppression duration for each of the plurality of links so that the link-specific durations of the plurality of links overlap in time for the specific period of time.

5. The communication device according to claim 4, wherein the control circuitry controls the transceiver to:
receive a request from the another communication device for setting the specific period of time for the multi-link operations; and
in response to the request, transmit the signal to each of the plurality of other communication devices.

6. A method performed by a communication device comprising a transceiver, the method comprising:
receiving a request from another communication device for setting a specific period of time for multi-link operations; and
in response to the request, transmitting a signal to each of a plurality of other communication devices via a respective link of a plurality of links, each signal including information regarding a link-specific period where a respective one of the plurality of other communication devices is to suppress communications on the respective link so that another communication device is able to perform multi-link operations via the plurality of links in a specific period of time,
wherein the information regarding the link-specific period comprises:
a link-specific suppression start time, and
a link-specific suppression duration, and
wherein the link-specific suppression start time and the link-specific suppression duration are set for each of the plurality of links so that the link-specific durations of the plurality of links overlap in time for the specific period of time.

* * * * *